Jan. 29, 1952  W. F. McDANIEL  2,583,701
AWNING STRUCTURE
Filed Feb. 6, 1950
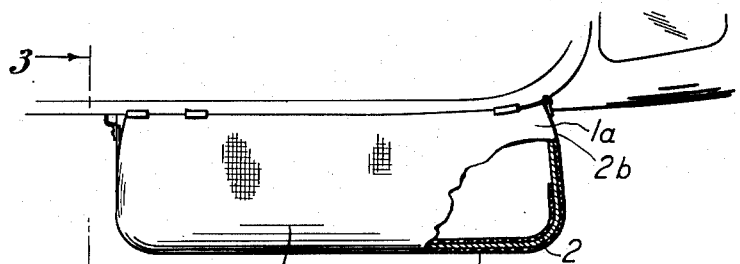
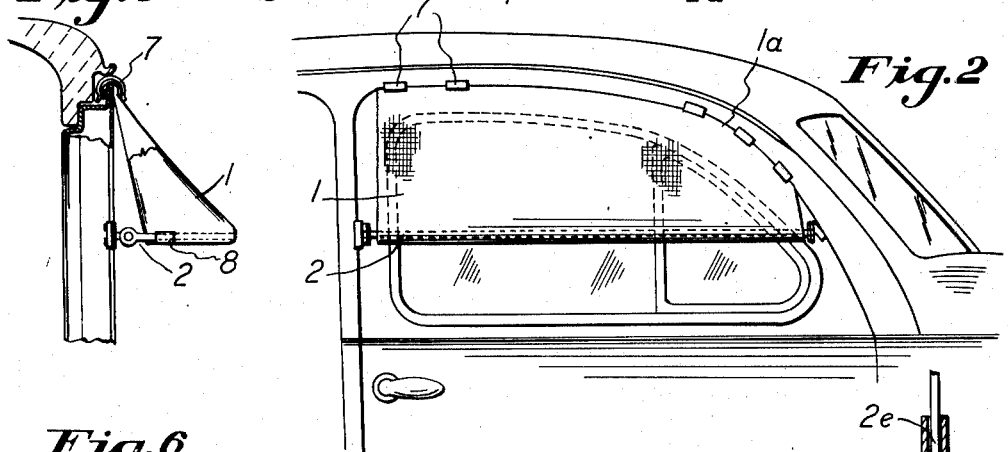
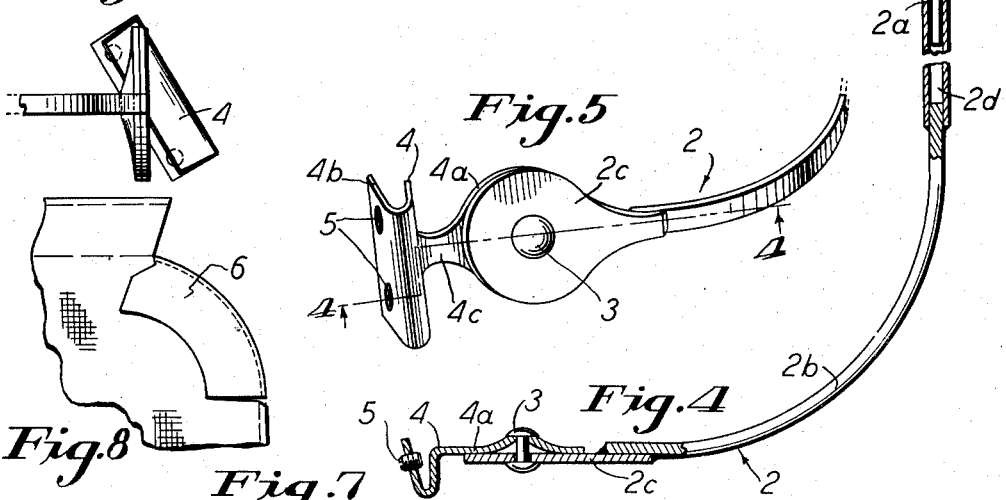
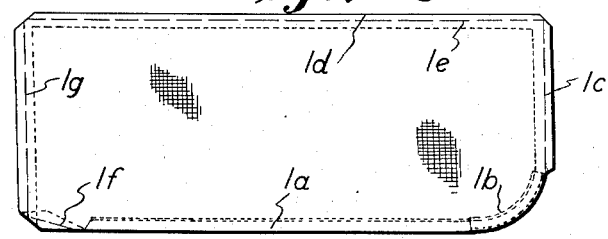
INVENTOR.
WILLIAM F. Mc. DANIEL.
BY
William E. Hall
Attorney.

Patented Jan. 29, 1952

2,583,701

UNITED STATES PATENT OFFICE 2,583,701

AWNING STRUCTURE

William F. McDaniel, Fort Dodge, Iowa

Application February 6, 1950, Serial No. 142,564

8 Claims. (Cl. 160—81)

My invention relates to an awning structure particularly adapted for automobile door windows.

One of the principal objects of this invention is to provide an awning structure which is simple, economical, and sturdy of construction in a manner whereby it may be supported rigidly in an unfolded condition in front of or on the outside of a window, or in an upwardly folded out-of-the-way condition against the body of the door, and whereby it may be readily shifted or folded, or unfolded, from one of the latter positions to the other.

An important object also of this invention is to provide an awning structure which may be easily, quickly, and simply applied to an automobile door over the window thereof, without in anyway mutilating the door or other part of the automobile.

Another important object of this invention is to provide an awning structure which may be readily fitted to doors of various shapes and widths.

A further important object of this invention is to provide novel and simple brackets for securing the awning to the door frame irrespective of the inclination of the sides or edges of the door.

With these and other objects in view, as will appear hereinafter, I have devised an awning structure having certain novel features of construction, combination, and arrangement of parts and portions, as will be hereinafter described in detail, and particularly set forth in the appended claims, reference being had to the accompanying drawings and to the characters of reference thereon, which form a part of this application, in which:

Fig. 1 is a plan view of a fragmentary portion of the right side of an automobile showing my automobile awning structure, in a preferred form, mounted on the front door thereof, and showing the same in an open or unfolded position, a portion of the awning being broken away and in section to facilitate the illustration;

Fig. 2 is a fragmentary side elevational view thereof;

Fig. 3 is a transverse sectional view of the automobile taken at 3—3 of Fig. 1, and showing my awning mounted thereon;

Fig. 4 is an enlarged fragmentary view of the rear portion of the awning frame, portions thereof being broken away and in section to facilitate the illustration, taken through 4—4 of Fig. 5;

Fig. 5 is a perspective view of the awning frame as observed substantially from the rear end;

Fig. 6 is a fragmentary elevational view showing the front portion of the frame, and showing particularly the securing bracket in a twisted form for securing the forward portion of the frame to the door of an automobile;

Fig. 7 is a substantially developed view of the flexible awning member; and,

Fig. 8 is an enlarged fragmentary view of the forward portion of the awning member during the process of fabrication.

My awning structure is designed to provide a shade and shield for the upper portions of automobile doors. It has an awning member 1 which, when the structure is lowered or unfolded for use, assumes a position which extends at an angle downwardly and outwardly from the upper portion of the door. The forward end of the awning, when unfolded, is closed with a downwardly and forwardly inclined portion. When thus lowered or unfolded, the awning shields the inside of the automobile, when the windows of the door are open, from wind and weather.

The awning member 1, as shown, is fastened at its normally upper edge to the upper edge of the door, and at its normally lower edge to the cross-portion 2ª of a U-shaped frame 2. This frame is a longitudinally extensible so that it may be readily adjusted to various width doors.

The legs 2ᵇ at the opposite ends of the frame are considerably rounded, as shown in Fig. 4, and the extreme ends thereof are provided with enlarged disc-shaped portions 2ᶜ, the axial portions of which are pivotally connected, by rivets 3, to disc-shaped portions 4ª at the outer ends of brackets 4.

The cross-portion 2ª of the frame comprises a flat tube 2ᵈ, one end of which is secured rigidly to one of the legs 2ᵇ and the other end of which is open for receiving an elongated portion 2ᵉ of the other leg. Both legs are flat to facilitate securing of the first leg to one end of the tube and telescoping the one end of the other leg into the other end of the tube. Such flattened construction prevents ready twisting of the telescoping portions.

The bracket 4 has a U-shaped clamp portion 4ᵇ at one end which is adapted to fit over the door seating flange located at the edge and outer portion of the conventional automobile door. The flange of the clamp member, which is positioned at the outer side of the door seating flange, is connected by means of a relatively narrow arm or strap 4ᶜ with one side of the disc-shaped portions 4ª. One of these brackets is positioned at each side of the door for supporting the frame 2 in a transverse position at the outside of the door. The innermost flange of the clamp portion 4$^b$ is secured to the inner side of the door seating flange by means of two screws 5, which are preferably headless set screws, as shown best in Fig. 4.

The forward edge of the door is usually considerably inclined, but the arm or strap 4$^c$ is sufficiently small and narrow that the clamp portion may be readily twisted with respect to the disc-shaped portion 4$^a$. This, however, is done by securing the bracket in position on the inclined edge and then by means of a pair of pliers twisting the disc-shaped portion so that the pivotal axis is located in a substantially horizontal position, as shown best in Fig. 6.

The disc-shaped portion 4$^a$ of each bracket may be offset inwardly, as shown best in Fig. 4, so as to provide a resilient frictional pivotal connection between the brackets and the frame 2 for holding the frame in either upwardly or downwardly folded positions.

The awning member 1, which is flexible and preferably made of waterproofed fabric material, is substantially rectangular in shape, as shown in Fig. 7. It is provided with a casing 1$^a$ at its outer edge, the casing being formed by a turned portion or hem. The cross-portion of the frame is threaded through this casing. The forward portion of the outer edge is cut circularly, as indicated by 1$^b$, and to this circularly cut edge is sewed a circular piece 6 which, when turned under, forms a circular casing for the rounded portion of the forward arm 2$^b$.

The forward end of the awning member 1 is turned under once or twice about the line 1$^c$ forming a finished edge at the forward end of the awning. The inner edge portion 1$^d$ of the awning member is folded under once or twice about the fold line 1$^e$, and this folded portion is placed over the upper edge of the door seating flange at the top of the door. The latter folded portion of the awning member is secured in place to the door seating flange by means of a plurality of U-shaped resilient clips 7.

The rear portion of the outer edge of the awning member may be folded under about the fold line 1$^f$ around the rounded portion of the rear leg of the frame 2 and secured to said rear leg by a clip 8. The rear edge of the awning member may be folded once or twice about the fold line 1$^g$, and this fold at the rear end is preferably made before the awning member is folded over the upper edge of the door seating flange. When the awning member is secured in position as stated, it assumes substantially the position and shape as indicated in Figs. 1, 2, and 3.

I wish it to be understood that I do not desire to be limited to the exact details of construction shown and described, for obvious modifications will occur to a person skilled in the art.

I claim:

1. In an awning structure of the class described, the combination with an automobile door having a window opening and thin outwardly directed door seating flanges at the side edges, of a pair of brackets, each having at its inner portion a transverse U-shaped clamp, each fitting over a flange at the opposite side edges of the door, a U-shaped awning frame having its legs pivotally connected to the outer portions of the brackets for pivotal movement in a vertical plane, and a flexible awning member secured at its lower edge to the cross-portion of the frame and at its upper edge to the upper portion of the door.

2. In an awning structure of the class described, the combination with an automobile door having a window opening and thin outwardly directed door seating flanges at the side edges, of a pair of brackets, each having at its inner portion a transverse U-shaped clamp, each fitting over a flange at the opposite side edges of the door, set screws extending through the innermost leg of each clamp and adapted to engage the inner side of the flanges, a U-shaped awning frame having its legs pivotally connected to the outer portions of the brackets for pivotal movement in a vertical plane, and a flexible awning member secured at its lower edge to the cross-portion of the frame and at its upper edge to the upper portion of the door.

3. In an awning structure of the class described, the combination with an automobile door having a window opening and thin outwardly directed door seating flanges surrounding the side and upper edges, of a pair of brackets, each having at its inner portion a transverse U-shaped clamp, each fitting over a flange at the opposite side edges of the door, a U-shaped awning frame having its legs pivotally connected to the outer portions of the brackets for pivotal movement in a vertical plane, a flexible awning member secured at its lower edge to the cross-portion of the frame, and means securing the upper edge over the edge of the upper flange of the door.

4. In an awning structure of the class described, the combination with an automobile door having a window opening and thin outwardly directed door seating flanges surrounding the side and upper edges, of a pair of brackets, each having at its upper portion a transverse U-shaped clamp, each fitting over a flange at the opposite side edges of the door, a U-shaped awning frame having its legs pivotally connected to the outer portions of the brackets for pivotal movement in a vertical plane, a flexible awning member secured at its lower edge to the cross-portion of the frame, and U-shaped spring clips securing the upper edge over the edge of the upper flange of the door.

5. In an awning structure of the class described, the combination with an automobile door having a window opening and thin outwardly directed door seating flanges surrounding the side and upper edges, of a pair of brackets, each having at its inner portion a transverse U-shaped clamp, each fitting over a flange at the opposite side edges of the door, a U-shaped awning frame having its legs pivotally connected to the outer portions of the brackets for pivotal movement in a vertical plane, a flexible awning member secured at its lower edge to the cross-portion of the frame, and means securing the upper edge and end edges, respectively, over the edges of the upper flange and upper portions of the side flanges of the door.

6. In an awning structure of the class described, the combination with an automobile door having a window opening and thin outwardly directed door seating flanges surrounding the side and upper edges, of a pair of brackets, each having at its inner portion a transverse U-shaped clamp each fitting over a flange at the opposite side edges of the door, a U-shaped awning frame having its legs pivotally connected to the outer portions of the brackets for pivotal movement in a vertical plane, a flexible awning member secured at its lower edge to the cross-portion of the frame, and U-shaped spring clips securing the upper edge and end edges, respectively, over the edges of the upper flange and upper portions of the side flanges of the door.

7. In an awning structure of the class described, the combination with an automobile door having a window opening and thin outwardly directed door seating flanges at the side edges, of a pair of brackets, each having at its inner portion a transverse U-shaped clamp, each fitting over a flange at the opposite side edges of the door, a U-shaped awning frame having its legs pivotally connected to the outer portions of the brackets for pivotal movement in a vertical plane, and a flexible awning member secured at its lower edge to the cross-portion of the frame and at its upper edge to the upper portion of the door, the clamp of at least one of the brackets being inclined outwardly and downwardly with respect to the horizontal pivotal connection of the bracket to said frame.

8. In an awning structure of the class described, the combination with an automobile door having a window opening, of a pair of brackets, each having at its inner portion a transverse clamp, each fitting an opposite side edge of the door, a U-shaped awning frame having its legs pivotally connected to the outer portions of the brackets for pivotal movement in a vertical plane, and a flexible awning member secured at its lower edge to the cross-portion of the frame and at its upper edge to the door, the clamp of at least one of the brackets being inclined outwardly and downwardly with respect to the horizontal pivotal connection of the bracket to said frame.

WILLIAM F. McDANIEL.

REFERENCES CITED

The following references are of record in the file of this patent:

UNITED STATES PATENTS

| Number | Name | Date |
| --- | --- | --- |
| 1,811,900 | Spurgeon | June 30, 1931 |
| 2,327,147 | Worthington | Aug. 17, 1943 |
| 2,350,297 | Vesta | May 30, 1944 |